United States Patent
Pillon

(10) Patent No.: US 7,388,807 B2
(45) Date of Patent: Jun. 17, 2008

(54) METHOD FOR AN ANTENNA ANGULAR CALIBRATION BY RELATIVE DISTANCE MEASURING

(75) Inventor: Denis Pillon, Cagnes/Mer (FR)

(73) Assignee: Thales (FR)

( * ) Notice: Subject to any disclaimer, the term of this patent is extended or adjusted under 35 U.S.C. 154(b) by 19 days.

(21) Appl. No.: 11/573,201

(22) PCT Filed: Jun. 30, 2005

(86) PCT No.: PCT/EP2005/053115

§ 371 (c)(1),
(2), (4) Date: Feb. 2, 2007

(87) PCT Pub. No.: WO2006/013136

PCT Pub. Date: Feb. 9, 2006

(65) Prior Publication Data

US 2008/0068927 A1    Mar. 20, 2008

(30) Foreign Application Priority Data

Aug. 3, 2004    (FR) .................................. 04 08594

(51) Int. Cl.
*G01S 15/50* (2006.01)
*G01S 15/66* (2006.01)
(52) U.S. Cl. ........................................................ 367/13
(58) Field of Classification Search ............... 367/13
See application file for complete search history.

(56) References Cited

U.S. PATENT DOCUMENTS 6,202,027 B1 *    3/2001    Alland et al. ............... 701/301

(Continued)

FOREIGN PATENT DOCUMENTS

EP    0 514 252 A    11/1992

(Continued)

OTHER PUBLICATIONS

Florin F: "Calibration of high frequency imaging deformable towed arrays" Oceans '94. 'Oceans Engineering for Today's Technology and Tomorrow's Preservation,' Proceedings Brest, France Sep. 13-16, 1994, New York, NY, USA, IEEE, vol. 1, pp. I-247, XP010124794; ISBN: 0-7803-2056-5; abstract; figures 1, 4. (Abstract).

(Continued)

*Primary Examiner*—Dan Pihulic
(74) *Attorney, Agent, or Firm*—Lowe Hauptman Ham & Berner, LLP

(57) ABSTRACT

The present invention relates to the angular calibration of passive reception systems such as sonars or active ones such as certain radars whose angular performance is inadequate.

The invention proposes a method making it possible to perform antenna calibration using the detection system associated with this antenna under real operating conditions.

The method according to the invention consists in making an immersed noisemaker deployed along a substantially rectilinear uniform trajectory and a submarine equipped with an antenna to be calibrated along any trajectory whatsoever, but nonrectilinear.

The method according to the invention consists also in implementing a trajectography algorithm making it possible to determine the noisemaker-antenna relative distance at known instants the, and to deduce therefrom the trajectory followed by the noisemaker as well as the bearing corresponding to the positions of the noisemaker at the measurement instants. The bearing thus calculated is compared with the bearing measurements carried out directly by the sonar associated with the antenna to be calibrated.

This method applies in particular to the calibration of sonar antennas during their commissioning.

20 Claims, 4 Drawing Sheets

U.S. PATENT DOCUMENTS 6,437,731 B1 * 8/2002 Henrio et al. ............... 342/165
2008/0068927 A1 * 3/2008 Pillon .......................... 367/13

FOREIGN PATENT DOCUMENTS

| EP | 0 899 581 A | 3/1999 |
| FR | 2 822 300 A | 1/1996 |
| FR | 2 798 196 A | 3/2001 |

OTHER PUBLICATIONS

Xerri B et al: "Passive tacking in underwater acoustic" Signal Processing, Amsterdam, NL, vol. 82, No. 8, Aug. 2002, pp. 1067-1085, XP004367259; ISSN: 0165-1684—entire document. (Abstract).

* cited by examiner

METHOD FOR AN ANTENNA ANGULAR CALIBRATION BY RELATIVE DISTANCE MEASURING

RELATED APPLICATIONS

The present Application is based on International Application No. PCT/EP2005/053115, filed Jun. 30, 2005, which in turn corresponds to French Application No. 04/08594 filed on Aug. 3, 2004 and priority is hereby claimed under 35 USC §119 based on these applications. Each of these applications are hereby incorporated by reference in their entirety into the present application.

FIELD OF THE INVENTION

The present invention relates to the angular calibration of passive reception systems such as sonars or active ones such as certain radars whose angular performance is inadequate.

BACKGROUND OF THE INVENTION

Calibrating an antenna consists in determining for all the useful directions the estimation error (bias and standard deviation) between the real direction of arrival of a signal received by the antenna and the direction of arrival estimated at the output of the antenna processing; the values measured are thereafter corrected upon utilization of the antenna by compensating for the corresponding bias. The knowledge of the bias in particular is a data item indispensable to the holding of the performance of the equipment associated with the antenna. In regard to the measurement of the bearing of the source, the equipment acts as a measurement apparatus whose antenna constitutes the sensor. A bias in the determination of the bearing can impair the tactical operation of the system and in particular the locating function. This is why it is generally useful to undertake a calibration.

To calibrate an antenna use is made of a noisemaker, preferably fixed, but usually mobile for operational reasons, in front of which the receiver is made to deploy in such a way that all the bearings of the span to be calibrated are explored: the source-receiver geometry must permanently be known perfectly (or moreover measured with an accuracy noticeably greater than the required accuracy for the receiver to be calibrated) in order for it to be possible to make the comparison between real bearing and estimated bearing on the reception antenna. The determination of the real bearing presupposes either its very accurate measurement by a procedure available during calibration or that it is possible to associate (temporally) signal emitted and signal received and therefore that it is possible to define the axis joining the position of the emitter to this of the antenna, corresponding to the measurement. It is necessary to specify in this regard that in principle propagation intervenes and that if one considers a signal emitted at the instant t it will be received at an instant t+ΔT (such that ΔT=D/c, c being the speed of sound in water and D being the distance traversed by the signal between source and reception antenna). For the calibration, the angle of arrival, measured on reception at t+ΔT, must theoretically be compared with the direction of the source axis at the date t and antenna at the date t+ΔT. This precaution is often neglected, the error that is made then being small since it is equal to v/1500 radians, v being the speed of motion of the source in m/s.

In the case of the calibration of sonar antennas carried by submarines, these two conditions impose constraints of implementation of the measurements which are difficult to satisfy, whatever method is used.

A first method commonly used in the past, consists in performing the calibration with the aid of a periscope. The calibration then consists in performing optical measurements of angles by means of the periscope of the submarine carrying the antenna to be calibrated and in comparing the angle measurement obtained by means of the periscope with the measurement provided by the sonar receiver associated with the antenna.

This first procedure has the advantage of simplicity. Specifically, it does not require any complementary measurement equipment, the periscope forming part of the onboard equipment. On the other hand, this procedure has several drawbacks.

Measurement by periscope firstly requires a prior operation of calibration of the periscope which must serve as measurement reference.

Measurement by periscope thereafter requires that the submarine remain just below the surface with the consequence, sometimes, that the antenna to be calibrated is incompletely immersed, thereby modifying its characteristics. Moreover, even if the antenna is completely immersed, the conditions of propagation of the sound waves under the surface are very particular and subject to meteorological vagaries, and this may impair the measurements. This method does not allow calibration of the antenna at various depths, this being necessary in order to take into account the variations in acoustic behaviour of the antenna as a function of pressure.

Periscopic sighting is, in good visibility conditions, a fairly accurate measurement. Nevertheless, to make an accurate measurement, it is necessary to be able to sight the source itself, this not being possible if the latter is hauled behind a boat or carried by a submarine vehicle.

On account of the constraints cited above, the method of calibration by periscope allows only imperfect calibration in overly constraining operational conditions. This is why it is often reserved for preliminary checks.

The arrival of modern electromagnetic positioning means using in particular satellite-based locating means, of GPS type for example, have upgraded the calibration methods based on the knowledge of the absolute positions of the noisemaker and of the receiver by removing in particular the depth and proximity constraints. With such locating means, the towing ship can ascertain its initial position with sufficient accuracy and refresh its position information throughout the duration of the calibration operation. Likewise, the submarine can ascertain before diving, its initial position, position information that it will be able to update over time by means of its onboard navigation instruments. It can thus use its inertial system (SINS) or else navigate by dead reckoning by means of the gyrocompass and the log. Thus, during the calibration operation the receiver performs angular measurements $\beta_m(t_i)$ and associates them with the coordinates of the submarine, calculated for the measurement instants $t_i$.

To carry out the calibration operation with such means, it remains to associate for each measurement instant $t_i$ the information of position of the noisemaker, available aboard the towing ship, with the information of position of the submarine and with the corresponding measurements $\beta_m(t_i)$, which are recorded aboard the submarine. This association is generally carried out on land by sifting of the recordings performed during the measurement operation.

With respect to the methods using a sighting by means of a periscope, previous case, this second type of method presents the advantage, as was stated previously, of enabling the noisemaker to be made to deploy at a sufficient distance to minimize the influence of parallax. Moreover, the submarine no longer being constrained by the need to raise its periscope, it is possible by virtue of this type of method to perform calibration measurements for various depths under pressure conditions that are more operational.

On the other hand the measurements being carried out independently on each vessel, this type of method does not enable the result of the calibration to be ascertained immediately on completion of the measurement operation. The sifting of the data, generally carried out on land, can take several weeks. This interlude can bring about a delay in the validation of the operational functionalities utilizing the azimuth measurements arising from the sonar.

This drawback can be partially circumvented by furnishing the towing ship and the submarine with means of acoustic communication allowing for example the towing ship to transmit its position in real time to the submarine during the measurement operation. However, these specific acoustic means are unwieldy to implement and expensive. Moreover, it may produce appreciable disturbances of the angle measurement.

It is also possible to envisage after the measurements phase, a phase of data transmissions between the towing ship and the submarine, the submarine resurfacing to establish a radio link with the towing ship, during which link the towing ship transmits its position file. The whole set of operations can then be processed thereafter aboard the submarine. In practice, this second solution presupposes that the towing ship, which is in general only a support vessel of the port institutions, is furnished with digital transmission means compatible with those of the submarine and having a sufficient throughput.

In all cases, this type of method, which involves GPS type means associated with various secure communication means, mobilizes a fairly unwieldy infrastructure. Moreover, they are inoperative in the event of a noisemaker carried by a submarine.

As regards known calibration methods it is finally possible to cite the methods using a fixed source of known position, for example anchored to the bottom. In practice, the use of such a method is very limited and can be applied only to configurations of shallow water type. In deep waters, the anchoring of a fixed source is difficult and to keep a towed noisemaker fixed is hardly conceivable. Towing ships preferring, for maritime safety reasons, not to remain at high tide with their engines stopped, move thereby causing movement of the noisemaker. The use of boats with dynamic positioning such as those of oil operations, moreover very noisy and not very widespread, does not offer any real solution to the problem of keeping the source in a fixed position at high tide.

It is noted therefore that the known prior art calibration methods, based on the knowledge by the receiver of the absolute positions of the noisemaker and of the reception antenna throughout the duration of the measurements, all exhibit significant drawbacks.

SUMMARY OF THE INVENTION

To remedy the drawbacks exhibited by the known prior art methods, the invention described consists of a method of angular calibration in a real situation of an antenna carried by a vehicle. The method according to the invention uses a mobile noisemaker in motion whose trajectory is reconstituted from the antenna carrier vehicle.

The trajectory of the noisemaker is reconstituted from the antenna carrier vehicle by means of a series of successive measurements, performed by said vehicle, of the relative distance between the noisemaker and the antenna.

According to a characteristic of the invention the noisemaker is imbued with a uniform rectilinear motion and the antenna with a nonrectilinear or uniform motion, making it possible to explore all the utilized directions.

According to another characteristic of the invention the trajectory of the noisemaker is reconstituted on the basis of the antenna-noisemaker relative distance measurements by means of a passive trajectography algorithm.

According to another characteristic of the invention the antenna to be calibrated being that of a passive submarine sonar, the relative distance measurements are carried out by the measurement of the propagation time of the signal originating from the noisemaker, said propagation time being measured by means of synchronous emission and reception clocks.

According to another characteristic of the invention the calculation of the relative distance, $d(t_i)$, between the noisemaker and the antenna at a given instant $t_i$, is performed by taking into account the bathycelerimetric profile of the medium.

According to another characteristic of the invention the consideration of the bathycelerimetric profile of the medium is carried out by utilizing a determined model of wave propagation, directly or through a chart.

In a preferred mode of implementation the vehicle carrying the antenna follows a substantially circular regular trajectory.

In another preferred mode of implementation the vehicle carrying the antenna follows a zig-zag trajectory.

The advantage of the invention is of not requiring a navigation system for the noisemaker nor any exchange of measurements between platforms.

When the trajectory of the source has been reconstituted, the antenna is calibrated by comparing the noisemaker direction estimated by the receiver with its real direction deduced from the trajectories of the noisemaker and of the antenna at the measurement instants considered $t_i$, for the noisemaker and $t_i + \Delta T_i$ for the antenna, or more simply at the instant $t_i$ if the propagation time is neglected.

BRIEF DESCRIPTION OF THE DRAWING

Other characteristics and advantages shall appear through the description which follows, illustrated by FIGS. 1 to 4 which represent.

DETAILED DESCRIPTION OF THE DRAWING

Figure 1:
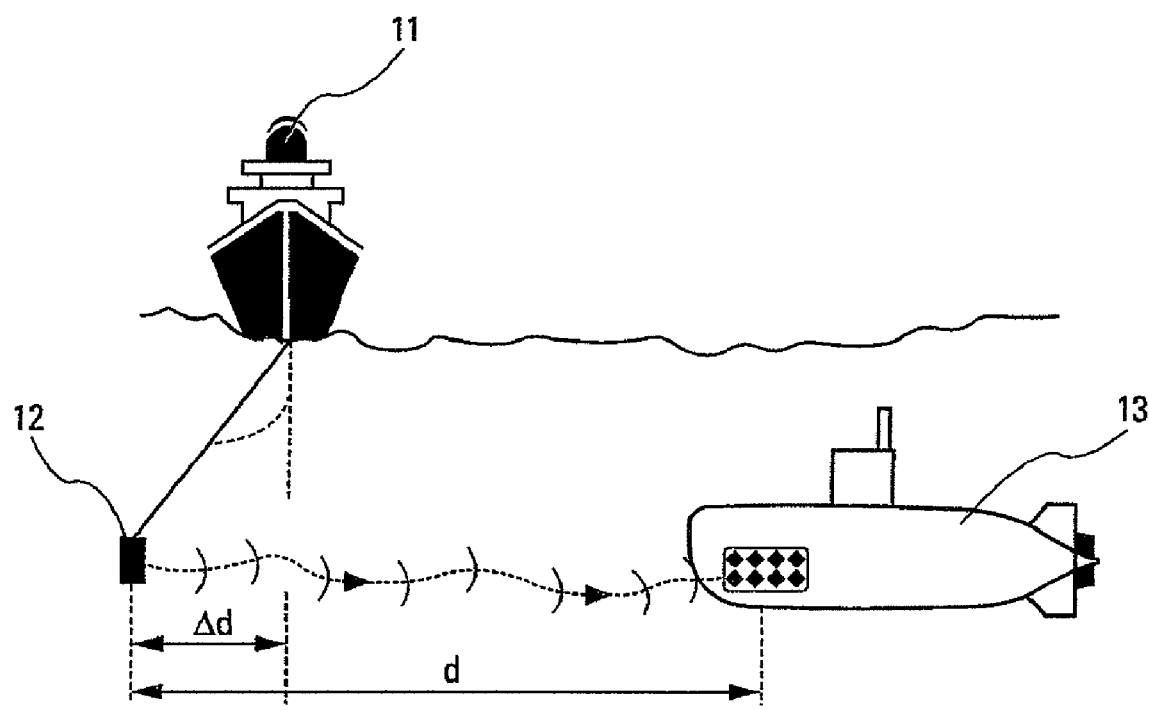
FIG. 1, a diagrammatic illustration of the mode of implementation of the method according to the invention, FIG. 2, an illustration of a possible type of measurement trajectory, given by way of nonlimiting example, FIG. 3, the basic schematic of the operation for determining the noisemaker-antenna relative distance, FIG. 4, a schematic summarizing the various operations of the method according to the invention.

FIG. 1 makes it possible to illustrate in a diagrammatic manner the principle of implementation of the calibration method according to the invention. As stated previously, the method according to the invention implements a surface ship 11 imbued with a relative motion with respect to the submarine 13 and towing a noisemaker 12 immersed at a given depth. The noisemaker can also be carried by a submarine or a remotely controlled vehicle. The noisemaker generally emits sound pulses which are received aboard the listening submarine 13 by the antenna 14 that one wishes to calibrate.

Figure 2:
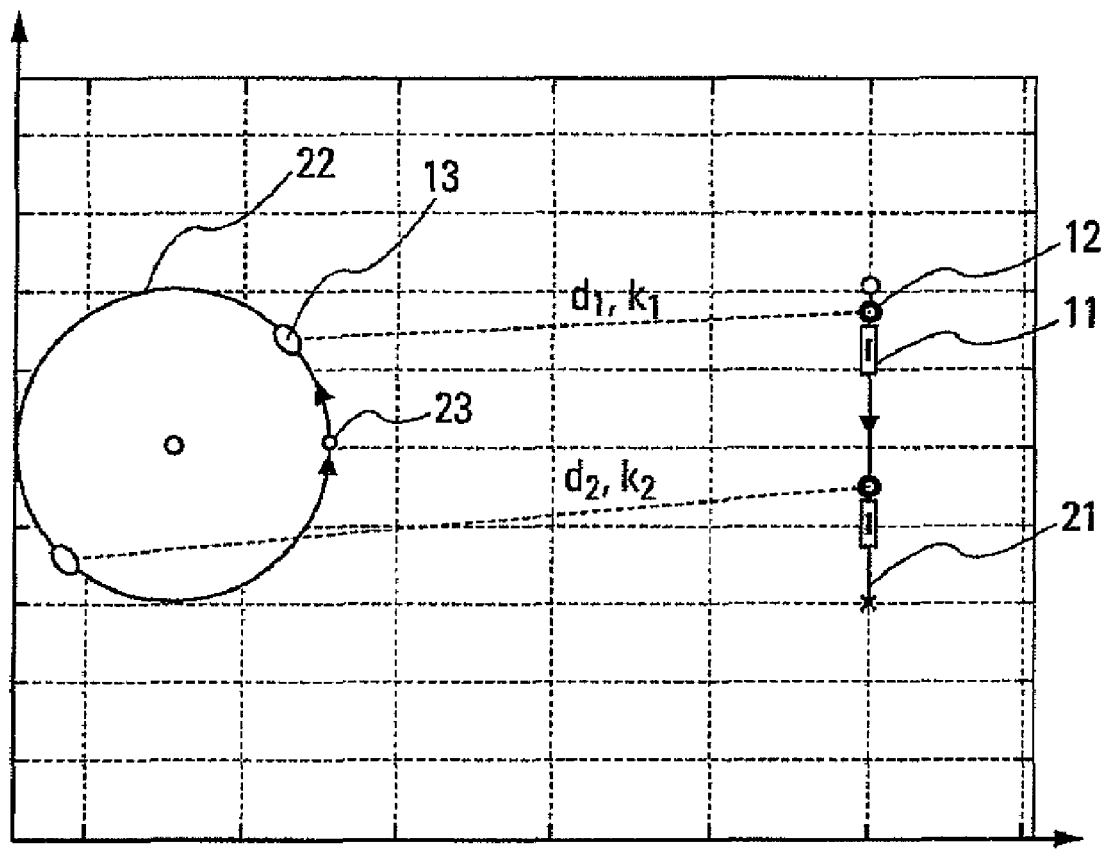

FIG. 2 illustrates in an example the procedure employed by the method according to the invention to circumvent direct measurements of the position of the noisemaker. As shown by the figure, the procedure consists in making the towing ship follow a substantially rectilinear uniform kinematic 21 and in making the submarine carrying the antenna to be calibrated follow any nonrectilinear trajectory 22. A trajectory which makes it possible to explore the bearings to be calibrated is preferably chosen. In the example of FIG. 2, the submarine 13 performs a loop according to a substantially circular trajectory.

The method according to the invention uses the relative distances determined at instants $t_i$. It also uses a particular passive trajectography algorithm to reconstitute with the necessary accuracy and without ambiguity the trajectory of the noisemaker. The implementation of this algorithm is advantageously facilitated by the choice of the particular trajectories defined previously, uniform rectilinear trajectory for the noisemaker and nonrectilinear trajectory for the antenna. This particular algorithm can be described as follows.

Although for calibration the directions are generally charted by bearings, that is to say with an "antenna" or "boat" reference, in the description of the algorithm the orthonormal reference frames are not tied to the craft and the angles are azimuths charted with respect to north.

Let $(x_r, y_r)$ be the antenna coordinates defined in a given reference frame and $(x_s, y_s)$ the coordinates of the noisemaker in the same reference frame, and by assuming the motion of the noisemaker is rectilinear uniform, this motion can be defined by a state vector with four components with the expression:

$$X \equiv X_s(t_0) = [x_s(t_0), y_s(t_0), v_x, v_y] \qquad [3]$$

where $x_s(t_0)$, $y_s(t_0)$, $v_x$ and $v_y$ are unknowns.

On the basis of this state vector, the position of the noisemaker at an instant $t_i$ is given by the expressions:

$$x_s(t_i; X) = x_s(t_0) + (t_i - t_0) \cdot v_x \qquad [4]$$

and $$y_s(t_i; X) = y_s(t_0) + (t_i - t_0) \cdot v_y \qquad [5]$$

Moreover, the coordinates of the noisemaker at a given instant $t_i$ can be expressed on the basis of the determination of $d(t_i)$ by the following relation:

$$d(t_i; X) = [(x_s(t_i; X) - x_R(t_i))^2 + (y_s(t_i; X) - y_R(t_i))^2]^{1/2} \qquad [6]$$

To ascertain the position of the noisemaker at the instants $t_i$, it is therefore important to determine the components $x_s(t_0)$, $y_s(t_0)$, $v_x$ and $v_y$ of the state vector X. For this purpose the method according to the invention determines the estimation $\Psi$ of the vector X by determining the values $x_s(t_0)$, $y_s(t_0)$, $v_x$ and $v_y$, which minimize a quadratic convergence criterion defined by the following relation:

$$J_d(X) = \Sigma [(d(t_i; X) - d^m(i))/\sigma_d(i)]^2 \qquad [7]$$

It is thus possible to write:

$$J_d(\Psi) = \min[J_d(X)] \qquad [8]$$

This minimization advantageously gives a unique solution to the extent that, as was specified above, the antenna follows a nonrectilinear trajectory. To find the minimum of $J_d(X)$, use is for example made of a gradient type algorithm that is initialized with the distance measured at to and with the azimuth measured by the sonar at the same initial instant.

Knowing the values $x_s(t_0)$, $y_s(t_0)$, $v_x$ and $v_y$, it is then possible to calculate the azimuth $\beta(t_i)$ corresponding to the noisemaker-antenna direction at a given instant $t_i$ by using the following formula:

$$\beta(t_i; \Psi) = \text{Arctangent}[(x_s(t_i; \Psi) - x_R(t_i))/(y_s(t_i; \Psi) - y_R(t_i))] \qquad [9]$$

in relation [9] $x_r(t_i)$ and $y_r(t_i)$ are the coordinates of the antenna at the instant $t_i$, which coordinates can be accurately determined by the onboard equipment of the submarine carrying the antenna to be calibrated.

The values $\beta(t_i)$ being obtained by means of the method according to the invention, the calibration thereafter consists in comparing for each instant the value of the azimuth measured by the antenna with the azimuth calculated at the same dates.

Thus, to calibrate a passive sonar, the method according to the invention undertakes the measurement of the series of relative distances necessary for the reconstitution of the trajectory of the noisemaker by measuring, with the aid of the receiver, the instant of arrival of the signals successively emitted at the dates $t_i$.

It should be noted that in the case of an active sonar, or else of a radar, calibration is facilitated by the fact that the equipment considered controls by itself the chronometry of the emissions and can therefore directly make an accurate measurement of the distance at each emission.

Figure 3:
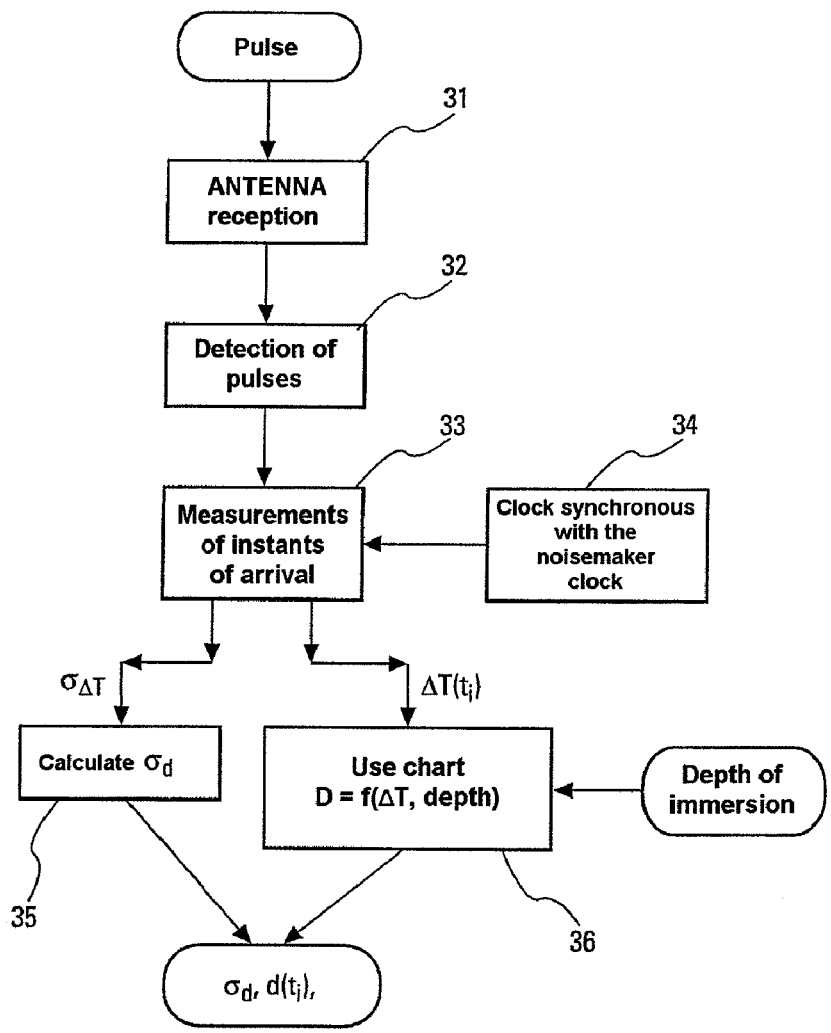

FIG. 3 presents the schematic of the function making it possible, in the implementation of the method according to the invention, to determine the noisemaker-antenna relative distance on the basis of the measurements of the instants of arrival of the signals emitted by the noisemaker.

At a given instant $t_i$, the noisemaker is situated at a distance D from the antenna. To first order, without taking account of the variations of c, we may write:

$$D = c \cdot \Delta t \qquad [10]$$

where c represents the speed of sound in the marine medium and where $\Delta t$ corresponds to the elapsed time between the instant of emission of the sound pulse by the noisemaker and the instant of reception by the antenna.

Knowing c and $\Delta t$ it is therefore possible to calculate, for determined instants, the distance separating the noisemaker from the antenna. The term c is (to a first approximation) a constant of the medium which can be measured moreover, while the term $\Delta t$ is the result of a measurement which can be carried out by determining the instant of reception of the pulse, if the equipment situated aboard the submarine knows in one way or another the instant of emission. In practice this knowledge results from a prior synchronization of the clocks of the ship 11 towing the noisemaker and of the submarine 13. The clocks used have in particular the feature of drifting very little over time. For this purpose the clocks used are precision quartz clocks, or else atomic clocks.

As shown by FIG. 3, the operation of calculating the relative distance comprises several steps.

The first two steps consist in the reception 31 of the signal by the antenna to be calibrated and of the estimation 32 of the instant of arrival of a pulse emitted by the noisemaker. This estimation is carried out in a known manner by detecting the rising edge of the pulse, or else by correlating the received signal or by any other known signal processing procedure.

In the course of the following step 33, the instant of arrival $T_i$ of the pulse emitted at the instant of emission $t_i$ by the noisemaker is measured, then the value of the delay $\Delta T(t_i)$ corresponding to the travel time of the pulse is calculated. The calculation of $\Delta T$ makes it necessary to have aboard the submarine, as stated previously, an accurate and stable internal clock 34, synchronous with the emission clock. For this purpose the clock 34 used is for example an atomic clock which presents the advantage of not requiring the synchronization with the clock of the noisemaker to take place just before the calibration operation. Such an antenna in fact exhibits a drift of less than 500 μs over a period of 24 hours, thereby corresponding to an error of distance measurements of 75 cm if a speed of the medium equal to 1500 m/s is considered.

The step of determining ΔT($t_i$) is accompanied furthermore by a step 35 of determining the accuracy $\sigma_{\Delta T}(t_i)$ of the measurement of ΔT. This accuracy is in particular dependent on the signal-to-noise ratio measured by the receiver associated with the antenna. From this determination is derived the value of the accuracy $\sigma_d(t_i)$ in the determination of the noisemaker-antenna relative distance, $\sigma_d(t_i)$ being related to $\sigma_{\Delta T}(t_i)$ by the formula $\sigma_d(t_i)=c\sigma_{\Delta T}(t_i)$.

According to the invention it is possible to take into account the variations in speed of sound in the medium to improve the estimation of the distance by also taking into account that sound does not propagate in a straight line.

Step 36, which runs in parallel with step 35, consists in determining the distance d($t_i$) on the basis of the calculation of ΔT performed in the preceding step. The determination of the distance d($t_i$) involves the speed of the sound wave in the medium traversed. But as was seen previously this speed varies in particular as a function of depth. The principal consequence of the variation in the speed of the medium will be to induce nonrectilinear propagation between the noisemaker and the antenna. There exist programs for calculating the propagation paths or rays of sound waves in a given medium, at a given depth which involve the nature of the bottom beds and the bathycelerimetric profile of the medium. These programs make it possible to define charts that can be used to determine as a function of the propagation time of the pulse emitted by the noisemaker and of the immersion depth, the relative distance d($t_i$) between the noisemaker and the antenna at the instant $t_i$. It is recalled here that the bathycelerimetric profile of the medium represents the variation of the speed of sound waves as a function of depth.

Thus, on completion of steps 35 and 36, the relative distance d($t_i$) and the measurement $\sigma_d(t_i)$ of the accuracy in d($t_i$) are available for each instant of measurement $t_i$.

Figure 4:
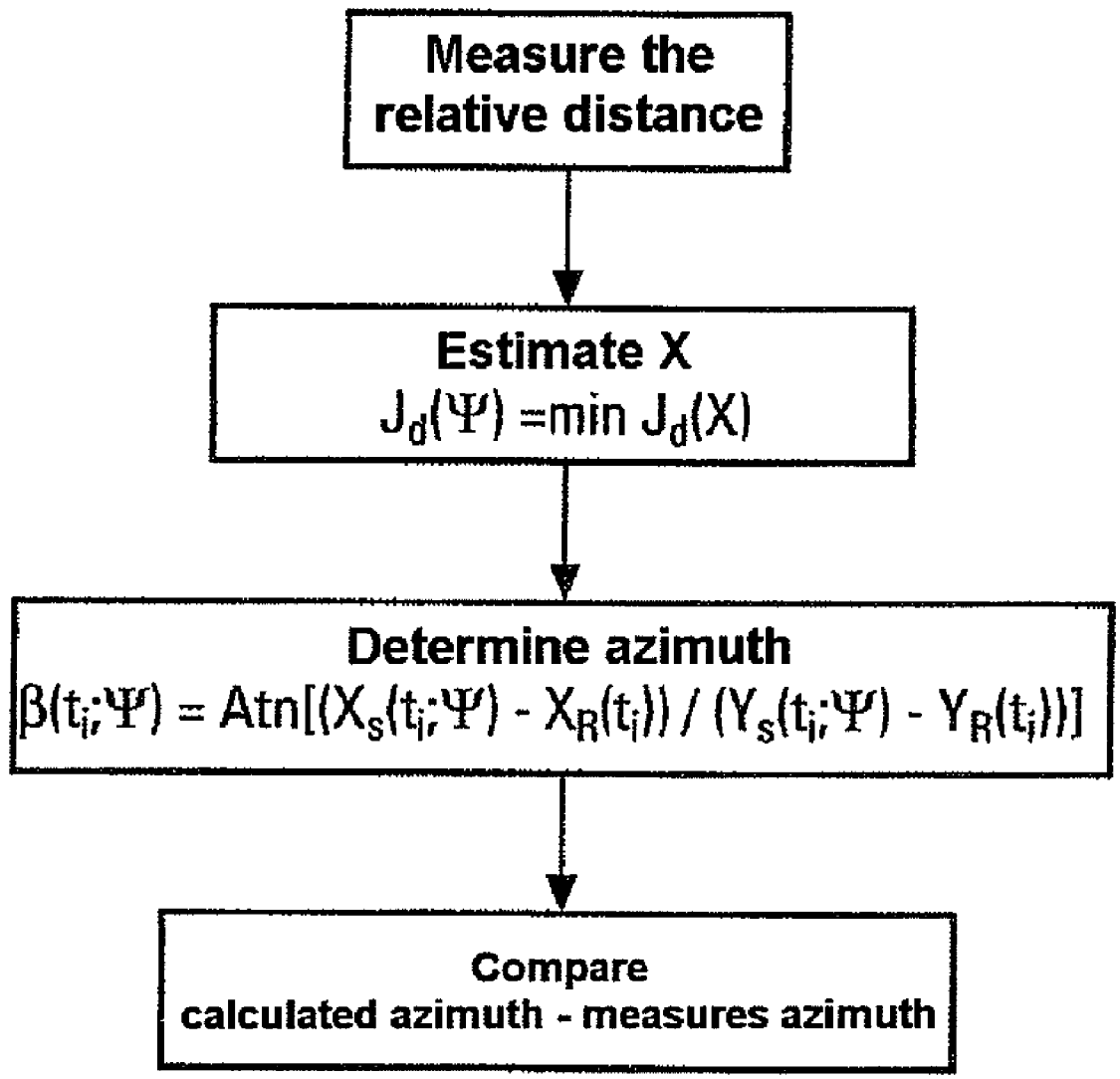

The method as a whole can be summarized by the illustration of FIG. 4.

In practice, the calibration zone is chosen in such a way that the bathycelerimetric profile is regular, that the bottom is flat and that there are no currents generating disturbances of the medium between the source and the receiver. Under these conditions, on the basis of the measured profile, propagation programs make it possible to calculate the precise path of the principal acoustic ray, termed direct. On the basis of this path, a travel time of the sound τ(d), d being the horizontal distance, is obtained. Through these precautions in the choice of the zone, of the propagation calculation program, of the exactness of the bathycelerimetric profile determined, of the accuracy of the clocks, for distance spans that may be of the order of some ten kilometers, an error in the determination of the distance of the order of a few meters is typically obtained.

Certain programs for determining the propagation conditions, which also take into account variations in speed as a function of distance, can be employed preferentially to those described above. However, having regard to the useful distances under calibration the differences noted are very small, except in very particular zones that are avoided for the calibrations.

In cases where it is not possible to find a relatively homogeneous zone for the calibration, the method according to the invention makes it possible to take into account the horizontal refractions and to utilize propagation models not only to estimate the relative distances but also to take into account the deviation of the direction of the signal on reception. Nevertheless this imposes a knowledge of the speed of sound at any point and at any moment that is difficult to obtain, thereby explaining the advantage afforded by the choice of a suitable zone.

The invention claimed is:

1. A method of angular calibration for an antenna carried by a vehicle,
    calibrating by using a mobile noisemaker moving along a uniform rectilinear trajectory, whose trajectory is reconstituted from the antenna carrier vehicle by means of a series of successive measurements performed by said carrier vehicle moving along a nonrectilinear or nonuniform trajectory, of a relative distance between the noisemaker and the antenna.

2. The method as claimed in claim 1, wherein the trajectory of the noisemaker is reconstituted on the basis of the antenna-noisemaker relative distance measurements by means of a passive trajectography algorithm.

3. The method as claimed in claim 1, wherein the vehicle carrying the antenna follows a substantially circular regular trajectory making it possible to explore all the directions exploited.

4. The method as claimed in claim 1, wherein the vehicle carrying the antenna follows a zig-zag trajectory.

5. The method as claimed in claim 1, wherein the antenna to be calibrated being that of a passive sonar, the relative distance measurements are carried out by the measurement of the propagation time (ΔT) of the signal originating from the noisemaker, said propagation time being measured by means of synchronous clocks.

6. The method as claimed in claim 1, wherein the relative distance (d($t_i$)), between the noisemaker and the antenna given instant $t_i$, is performed by taking into account the bathycelerimetric profile of the medium.

7. The method as claimed in claim 6, wherein the consideration of the bathycelerimetric profile of the medium is carried out by utilizing a determined model of wave propagation, directly through a chart.

8. The method as claimed in claim 2, wherein the vehicle carrying the antenna follows a substantially circular regular trajectory making it possible to explore all the directions exploited.

9. The method as claimed in claim 2, wherein the vehicle carrying the antenna follows a substantially circular regular trajectory making it possible to explore all the directions exploited.

10. The method as claimed in claim 2, wherein the antenna to be calibrated being that of a passive sonar, the relative distance measurements are carried out by the measurement of the propagation time (ΔT) of the signal originating from the noisemaker, said propagation time being measured by means of synchronous clocks.

11. The method as claimed in claim 3, wherein the antenna to be calibrated being that of a passive sonar, the relative distance measurements are carried out by the measurement of the propagation time (ΔT) of the signal originating from the noisemaker, said propagation time being measured by means of synchronous clocks.

12. The method as claimed in claim 4, wherein the antenna to be calibrated being that of a passive sonar, the relative distance measurements are carried out by the measurement of the propagation time (ΔT) of the signal originating from the noisemaker, said propagation time being measured by means of synchronous clocks.

13. The method as claimed in claim 2, wherein the relative distance (d($t_i$)), between the noisemaker and the antenna given instant $t_i$, is performed by taking into account the bathycelerimetric profile of the medium.

14. The method as claimed in claim 3, wherein the relative distance ($d(t_i)$), between the noisemaker and the antenna given instant $t_i$, is performed by taking into account the bathycelerimetric profile of the medium.

15. The method as claimed in claim 4, wherein the relative distance ($d(t_i)$), between the noisemaker and the antenna given instant $t_i$, is performed by taking into account the bathycelerimetric profile of the medium.

16. The method as claimed in claim 5, wherein the relative distance ($d(t_i)$), between the noisemaker and the antenna given instant $t_i$, is performed by taking into account the bathycelerimetric profile of the medium.

17. The method as claimed in claim 13, wherein the consideration of the bathycelerimetric profile of the medium is carried out by utilizing a determined model of wave propagation, directly through a chart.

18. The method as claimed in claim 14, wherein the consideration of the bathycelerimetric profile of the medium is carried out by utilizing a determined model of wave propagation, directly through a chart.

19. The method as claimed in claim 15, wherein the consideration of the bathycelerimetric profile of the medium is carried out by utilizing a determined model of wave propagation, directly through a chart.

20. The method as claimed in claim 16, wherein the consideration of the bathycelerimetric profile of the medium is carried out by utilizing a determined model of wave propagation, directly through a chart.

* * * * *